United States Patent
Staude et al.

(10) Patent No.: US 11,027,611 B2
(45) Date of Patent: Jun. 8, 2021

(54) SENSOR DEVICE FOR A VEHICLE AND METHOD FOR OPERATING SUCH A SENSOR DEVICE

(71) Applicant: Valeo Schalter und Sensoren GmbH, Bietigheim-Bissingen (DE)

(72) Inventors: Sascha Staude, Bietigheim-Bissingen (DE); Stefan Mueller, Bietigheim-Bissingen (DE); Landry Tandjeu-Tchuissi, Bietigheim-Bissingen (DE); Raphael Mack, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/470,386

(22) PCT Filed: Nov. 28, 2017

(86) PCT No.: PCT/EP2017/080659
§ 371 (c)(1),
(2) Date: Jun. 17, 2019

(87) PCT Pub. No.: WO2018/108516
PCT Pub. Date: Jun. 21, 2018

(65) Prior Publication Data
US 2019/0389309 A1    Dec. 26, 2019

(30) Foreign Application Priority Data
Dec. 16, 2016    (DE) ..................... 10 2016 124 592.5

(51) Int. Cl.
*B60K 37/06*    (2006.01)
*G06F 3/044*    (2006.01)
*G06F 3/041*    (2006.01)

(52) U.S. Cl.
CPC .............. *B60K 37/06* (2013.01); *G06F 3/044* (2013.01); *G06F 3/0445* (2019.05); *G06F 3/04166* (2019.05); *B60K 2370/1442* (2019.05)

(58) Field of Classification Search
None
See application file for complete search history.

(56) References Cited

U.S. PATENT DOCUMENTS

2010/0164889 A1* 7/2010 Hristov ................. G06F 3/0416
                                                          345/173
2010/0268426 A1* 10/2010 Pathak .................. G06F 3/0482
                                                          701/48

(Continued)

FOREIGN PATENT DOCUMENTS

DE    102011011769 A1    8/2012
DE    102013112651 A1    5/2015
DE    102015112444 A1    2/2017

OTHER PUBLICATIONS

International Search Report and Written Opinion issued in corresponding PCT Application No. PCT/EP2017/080659, dated Mar. 6, 2018 (11 Pages with English Translation of International Search Report).

(Continued)

*Primary Examiner* — Stephen T. Reed
(74) *Attorney, Agent, or Firm* — Osha Bergman Watanabe & Burton LLP

(57) ABSTRACT

The invention relates to a sensor device for a vehicle for capacitively detecting input means in the region of a detection area, having a first sensor electrode and a second sensor electrode and an evaluation unit which is electrically connected to a respective first connection of the first sensor electrode and of the second sensor electrode via connection lines. The object of the invention is to provide a particularly accurate and reliable sensor device for a vehicle for capaci- (Continued)

Figure 1:
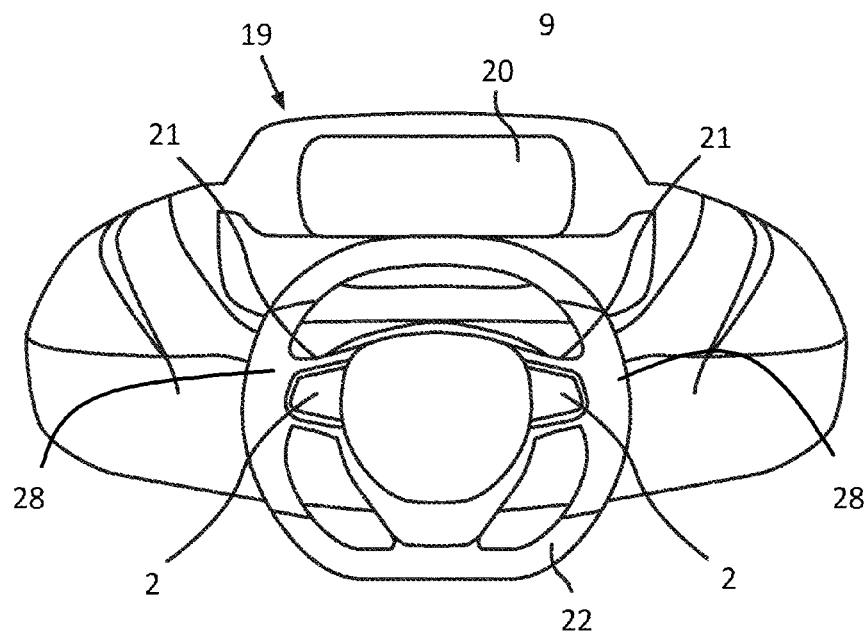

tively detecting input means. The object according to the invention is achieved by using respective second connections on the first sensor electrode and on the second sensor electrode and by means of corresponding methods for detecting the presence of input means and for detecting faults.

29 Claims, 5 Drawing Sheets

(56) References Cited

U.S. PATENT DOCUMENTS

| | | | |
|---|---|---|---|
| 2014/0318244 A1* | 10/2014 | Tsutsumi | G01C 19/5776 |
| | | | 73/504.12 |
| 2014/0375584 A1* | 12/2014 | Kaiser | H03K 17/955 |
| | | | 345/173 |
| 2015/0261377 A1* | 9/2015 | Reynolds | G06F 3/0416 |
| | | | 345/174 |
| 2016/0132281 A1 | 5/2016 | Yamazaki et al. | |

OTHER PUBLICATIONS

Burke Davidson, Microchip Technology Inc., mTouch Sensing Technology Water Resistance, http://ww1.microchip.com/downloads/en/AppNotes/00002098A.pdf., dated Jul. 14, 2015 (9 Pages).

* cited by examiner

| 10 | 14 | 11 | 15 | 10 + 14 | 11 + 15 | 12 | Type of measurement |
|---|---|---|---|---|---|---|---|
| X |  |  |  |  |  | X | Capacitance |
|  | X |  |  |  |  | X | Capacitance |
|  |  | X |  |  |  | X | Capacitance |
|  |  |  | X |  |  | X | Capacitance |
|  |  |  |  | X |  | X | Capacitance |
|  |  |  |  |  | X | X | Capacitance |
| X |  | X |  |  |  |  | Capacitance |
|  | X |  | X |  |  |  | Capacitance |
| X |  |  | X |  |  |  | Capacitance |
|  | X | X |  |  |  |  | Capacitance |
|  |  |  |  | X | X |  | Capacitance |
|  | X |  | X |  |  |  | Capacitance |
|  |  | X | X |  |  |  | Capacitance |
| X |  |  |  | X |  |  | Capacitance |
|  | X |  |  | X |  |  | Capacitance |
| X | X |  |  |  |  |  | Continuity check, resistance measurement |
|  |  | X | X |  |  |  | Continuity check, resistance measurement |

Fig. 6

SENSOR DEVICE FOR A VEHICLE AND METHOD FOR OPERATING SUCH A SENSOR DEVICE

The invention relates to a sensor device for a vehicle, in particular an operating device for controlling safety-relevant functions, for capacitively detecting a presence of an input means in the region of a detection area of a sensor surface, having a first electrically conductive sensor electrode, which is arranged in the region of the detection area, and having an evaluation unit which is electrically connected to an associated connection of the first sensor electrode via a first connection line. The evaluation unit is designed to measure the capacitance with respect to the system earth at the connection of the first sensor electrode.

The invention also relates to a method for operating a sensor device described above.

Sensor devices for the touch-sensitive detection of an input means in the region of a detection area for safety-relevant applications are known from the document DE 102011011769 A1 by Fresenius Medical Care.

Said document discloses a possible way of detecting the input on a touch-sensitive screen, or else touchscreen, in a particularly reliable manner, thus enabling safety-relevant use in medical devices. Using redundant sensor elements ensures that inputs can be repeatedly detected. As a result of this measure, inputs are intended to be detected in a particularly reliable manner and faults are intended to be avoided.

The detection of a corresponding input or the presence of a corresponding input means in accordance with the capacitive principle is also known from the prior art.

The non-pre-published patent application DE 102015112444.0 by the applicant describes the use of capacitive sensor electrodes in combination with a corresponding evaluation circuit in order to detect the presence of an input means. If an input means approaches the capacitive sensor electrode or in the case of corresponding contact, the electrical field between the sensor electrode and the reference potential or earth is changed. As a result, the capacitance of the sensor electrode changes and can be detected by the evaluation circuit. The capacitance change if an input means is present can additionally also be detected using the sensor electrode with respect to a second sensor electrode or reference electrode.

In the case of operating devices in vehicles with great safety relevance in particular, for example for switching driving assistance functions on and off, such as (partially) automated driving or else the detection of the hands of the driver on the steering wheel, the problem exists of being able to detect the inputs by the driver in an unambiguous and reliable manner and of being able to check the functionality of the operating device.

The object of the invention is therefore to provide a particularly accurate and reliable sensor device for a vehicle, in particular an operating device for controlling safety-relevant functions, for capacitively detecting a presence of an input means in the region of a detection area of a sensor surface and to provide an associated method for detecting inputs and faults.

This object is achieved by means of a sensor device according to the invention and by means of a method according to the invention in accordance with the respective independent patent claims. The dependent patent claims, the description and the figures relate to advantageous embodiments of the invention.

A sensor device according to the invention is characterized in that the evaluation device is additionally electrically connected to a second associated connection of the first sensor electrode via a second connection line, wherein the first connection and the second connection are arranged in mutually opposite end regions of the first sensor electrode.

Such an arrangement of the evaluation unit and the additional connections of the sensor electrode make it possible to carry out additional evaluation and fault measurements, which is advantageous, in particular, if the sensor electrodes fracture or if contact resistances form. In addition, the presence of an input means in the region of the detection areas can be detected in multiple ways and thereby in a more accurate manner.

In one preferred configuration of the sensor device according to the invention, the sensor device has a second electrically conductive sensor electrode having a first associated connection in the region of the detection area. The evaluation unit is connected to the first connection of the second sensor electrode via a third connection line. This measure makes it possible to carry out a second capacitance measurement with respect to the system earth in order to detect an input means. Furthermore, it would also be possible to carry out a capacitance measurement between the first sensor electrode and the second sensor electrode. In particular, the second sensor electrode can act here as a so-called stimulation electrode by virtue of the evaluation unit providing a stimulation signal at the first connection of the second sensor electrode so that the evaluation unit can carry out the capacitance measurement on the first sensor electrode by detecting the signal which has been coupled over, for example according to the CVD method mentioned later.

Furthermore, according to another advantageous configuration, the second sensor electrode of the sensor device according to the invention may have a second connection, wherein the first connection and the second connection of the second sensor electrode are each arranged in mutually opposite end regions of the sensor electrode. In this case, the evaluation unit of the sensor device is connected to the second connection of the second sensor electrode via a fourth connection line, with the result that capacitance and control measurements can also be carried out via this.

In one advantageous configuration of the sensor device according to the invention, the evaluation unit is designed to carry out a continuity check between the first and second connections of the first and/or second sensor electrode. This can be carried out, in particular, by applying a first voltage level to the first or second connection of a sensor electrode and then measuring a second voltage level at the respective other connection of the respective sensor electrode. In the case of a sensor electrode without a fracture of the conductor track or of the sensor area, the evaluation unit would measure substantially the same voltage level at one connection which was previously applied to the other connection. A fault in the sensor electrode can be inferred in the event of deviations between the values of the voltage levels, in which case differences of more than 0.2 V, for example, would indicate a fault.

Alternatively, it would also be possible for the evaluation unit to measure the voltage drop between the first and second connections on a respective sensor electrode. This voltage drop must be substantially 0 V in the fault-free case since the sensor electrodes generally have good electrical conductivity. As soon as a voltage drop which is greater than a defined or else reference value is measured here, a fault in the sensor electrode can be assumed. Voltage drops between the connections of a sensor electrode of more than 0.2 V or else 0.5 V, in particular, would be an indicator, for example, of the fact that there is a defect in the sensor electrode.

In another advantageous configuration of the sensor device according to the invention, the evaluation unit determines, on the basis of the measured voltage drop between the connections of a sensor electrode and the current flowing in the process, the non-reactive resistance of the respective sensor electrode between the respective connections. This has the advantage that the state of the sensor electrode can be determined in a considerably more accurate manner on account of the exactly determined resistance. This measurement is particularly useful, in particular for the case in which a material having a particular non-reactive resistance is used for the sensor electrodes. As a result, the measured value can be compared with a desired resistance value or else a reference value and a fault can be inferred in the event of deviations.

In order to detect faults, the above-mentioned measurements can be carried out individually or else in various combinations with one another and in a different order.

In principle, the above-mentioned or the following apparatuses and methods can be used to check not only the functionality of the sensor electrode but also the functionality of the evaluation unit per se, in particular if calibration values or even drift models of the relevant parameters are known. The measured values can be compared with the calibration or reference values and a fault can thus be inferred. The evaluation can be carried out by the evaluation unit to be monitored or else by a second evaluation unit in order to ensure reliable fault detection.

In one preferred configuration of the sensor device according to the invention, the evaluation unit is designed to respectively measure the capacitance with respect to earth or the reference potential at the first connection and at the second connection of the first sensor electrode and/or of the second sensor electrode. As a result, two capacitance measurements can be carried out independently of one another and can be compared with one another. If the sensor device is functional, the results of the first and second measurement must be substantially identical, in which case these measurements can also be carried out in a parallel manner. A diverse measured value is therefore provided and can be used to check the plausibility of the entire measuring device. As soon as a sensor electrode area or conductor track fractures, for example, this results in different capacitance values depending on the selected connection of the corresponding sensor electrode.

In addition, it may be advantageous that, according to another configuration of the sensor device according to the invention, the evaluation unit is designed to interconnect the first connections and second connections of the respective first sensor electrode and/or second sensor electrode and to measure the capacitance of the first sensor electrode and/or of the second sensor electrode with respect to earth or the reference potential via the respective interconnected connections. This makes it possible, even if the sensor electrode area or conductor track fractures, to reliably carry out a capacitance measurement without restricting the function of the sensor device since the effective sensor electrode area remains almost identical and a change in the capacitance as a result of the presence of an input means can always be detected.

In one preferred configuration of the sensor device according to the invention, the evaluation unit interconnects the first connections and second connections of the first sensor electrode and of the second sensor electrode and measures the capacitance between the first sensor electrode and the second sensor electrode via the respective interconnected connections. On the one hand, a second continuous capacitance measurement is fundamentally possible here between the sensor electrodes, in addition to the first continuous capacitance measurement of the first sensor electrode with respect to earth, as a result of which it is possible to more accurately determine the capacitance change if an input means is present since two measured values are again available here for detecting an input means.

On the other hand, the capacitance measurement for detecting the presence of an input means can also still be carried out here, as in the previous configuration, in the event of a fault, for example if the sensor electrode area fractures, since the effective sensor electrode area also remains unchanged here by interconnecting the sensor electrode connections and a change in the capacitance if an input means is present can be detected thereby.

In all of the above-mentioned configurations, it is fundamentally possible, in addition to the first continuous capacitance measurement of the first sensor electrode with respect to earth, to provide a second continuous capacitance measurement between the first sensor electrode and the second sensor electrode according to one advantageous configuration of the sensor device according to the invention with the aid of a second sensor electrode in order to detect the presence of an input means in the region of the detection area via the capacitance change. The two measurements increase the accuracy with which the capacitance change is captured if an input means is present. In this configuration, the capacitive voltage divider method (CVD method) from Microchip can also be used, in particular, here in order to determine the capacitance. For further information on this method, reference is made to the application note of AN2098 from Microchip, which can be found on the Internet at: http://ww1.microchip.com/downloads/en/AppNotes/00002098A.pdf.

Alternatively, the capacitance measurement or the detection of the capacitance change can be carried out, for example, by detuning the capacitance of a resonant circuit or else by measuring the charging curves of current or voltage of the respective capacitances. In this respect, there is no restriction in terms of the measuring method for measuring the capacitance.

In another configuration of the sensor device according to the invention, the evaluation unit is designed to interconnect the first connection and the second connection of a first sensor electrode or of a second sensor electrode and to carry out a capacitance measurement between the interconnected connections of the first sensor electrode or of the second sensor electrode and the first connections or second connections of the respective other sensor electrode. This further variant provides a plurality of background capacitance values, that is to say without the presence of an input means, which can be used to detect faults or actuation by comparing these static capacitance values with known reference values. A fault can be inferred in the event of a deviation from the reference values.

In principle, it is advantageous that, for the purpose of detecting faults or increasing the operating accuracy, at least two different measurements are carried out in order to compare these measured values with one another or with a reference value. In this case, the at least two different measurements can each comprise capacitance measurements in a different connection configuration. However, it is also possible to combine one or more capacitance measurements with the other measurements for the continuity check, the resistance measurement or the voltage drop measurement with the corresponding connection configuration.

In particular, the possibility of carrying out the capacitance measurement and the continuity check, resistance measurement or voltage drop measurements in a parallel manner is a particularly preferred configuration of the sensor device according to the invention. For this purpose, the voltages, signals or signal profiles provided by the evaluation unit for the capacitance measurement can also be used for the continuity check, resistance measurement or voltage drop measurements.

In another advantageous configuration of the sensor device according to the invention, the sensor electrodes are in the form of metal structures on a printed circuit board. This has the advantage that these sensor electrodes can be produced in stable and reliable manufacturing processes in a cost-effective manner. In this case, the structures may be in the form of plates or else in the form of a conductor track. If the sensor electrodes are in the form of conductor tracks, it would also be advantageous to design them as meandering and intermeshing provided that first and second sensor electrodes are present. However, the meandering structure of the conductor track also has advantages in an individual sensor electrode since it provides optimum space utilization. Interleaved structures would also be conceivable in the case of sensor electrodes in the form of plates. In addition, different layers on the printed circuit board can also be used for the first sensor electrode and for the second sensor electrode, for example the front side of the printed circuit board, on the one hand, and the rear side of the printed circuit board, on the other hand.

The sensor device according to the invention is also suitable for providing a method for increasing the measurement accuracy or the detection accuracy of input means in the region of the detection area and for detecting faults. In one advantageous configuration of the sensor device according to the invention, the evaluation unit uses at least two different capacitance measured values from different connection configurations in order to increase the probability of an input means being detected in the region of the detection area. Different connection configurations can be advantageous depending on the input means and the manner of input.

Irrespective of the connection configuration, the so-called capacitive voltage divider method, which uses two sensor electrodes to determine the capacitance, is used in one advantageous configuration of the sensor device according to the invention. In this case, the capacitance is determined from the ratio of the voltage of the internal capacitance of a sample-and-hold element of an analogue/digital converter (AD converter) in the evaluation unit and the voltage at the capacitance of the first sensor electrode with respect to earth and/or the voltage between the two sensor electrodes. So that capacitance changes can be captured, the capacitance measurements are carried out continuously and the temporal profile of the capacitance is determined.

This method can be parallelized in a particularly advantageous manner by virtue of the evaluation unit, for example, having two independent AD converters which are respectively connected to a first connection and to a second connection of the first sensor electrode. On the one hand, the internal capacitance can be increased as a result of parallel connection and the measurement accuracy can therefore be improved. On the other hand, however, the drifts of the two AD converters with respect to one another can also be monitored and a further fault can therefore be inferred.

If reference is made to parallel measurement in connection with the measuring methods described here, this comprises the simultaneous measurement using separate AD converters or corresponding measuring assemblies or else the sequential recording of measured values with considerably faster sampling of the measured values with respect to the measured value changes by means of only one AD converter or the corresponding measuring assembly using a multiplexer or demultiplexer.

In another advantageous configuration of the sensor device according to the invention, the evaluation unit reports faults, which have been determined using the above-mentioned apparatuses and methods, to a central or decentralized electronic control unit. The control unit evaluates the faults and carries out corresponding measures in order to ensure safety in the vehicle, for example. It is thus conceivable, for example, for certain functions which are connected or can be operated by means of the sensor device to no longer be offered as soon as a fault is detected, for example driving assistance systems such as (partially) autonomous driving of the vehicle, for corresponding messages to be output to the driver and/or for certain active functions to be terminated in a defined manner.

Some of the features or properties mentioned relate both to a sensor device according to the invention and to a method according to the invention. Some of these features are sometimes described only once but apply, independently of one another, both to a sensor device according to the invention and to a method according to the invention within the scope of technically possible configurations. The preferred embodiments presented with respect to the sensor device and their advantages therefore also accordingly apply to a method according to the invention and vice versa.

The invention is explained in more detail below on the basis of preferred exemplary embodiments with reference to the accompanying drawings.

Figure 2:
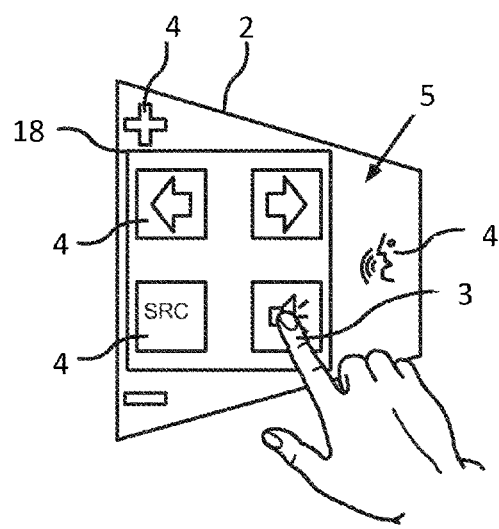
Figure 3A:
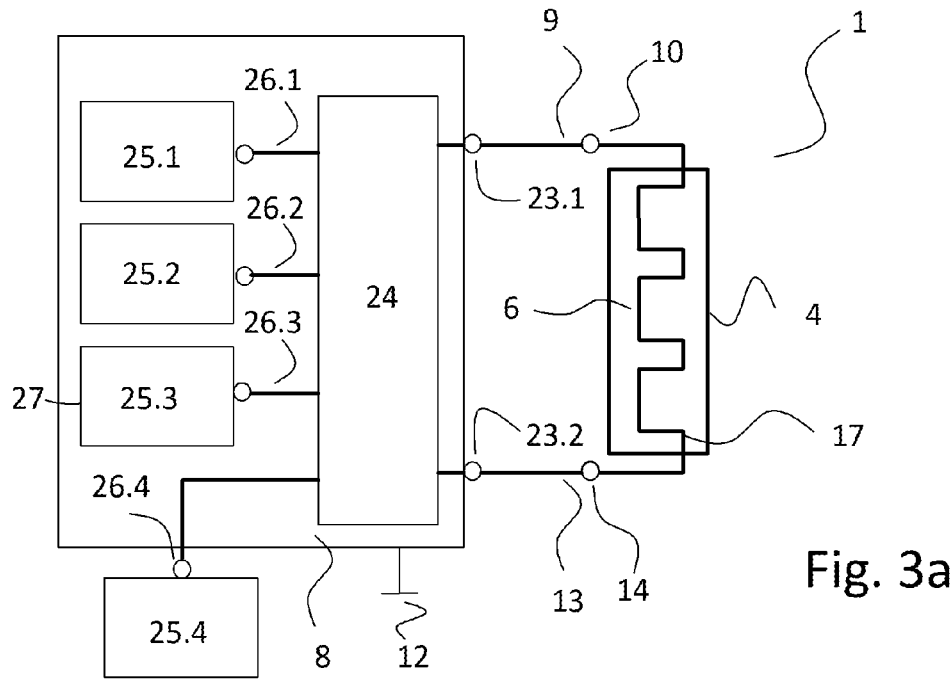
Figure 3B:
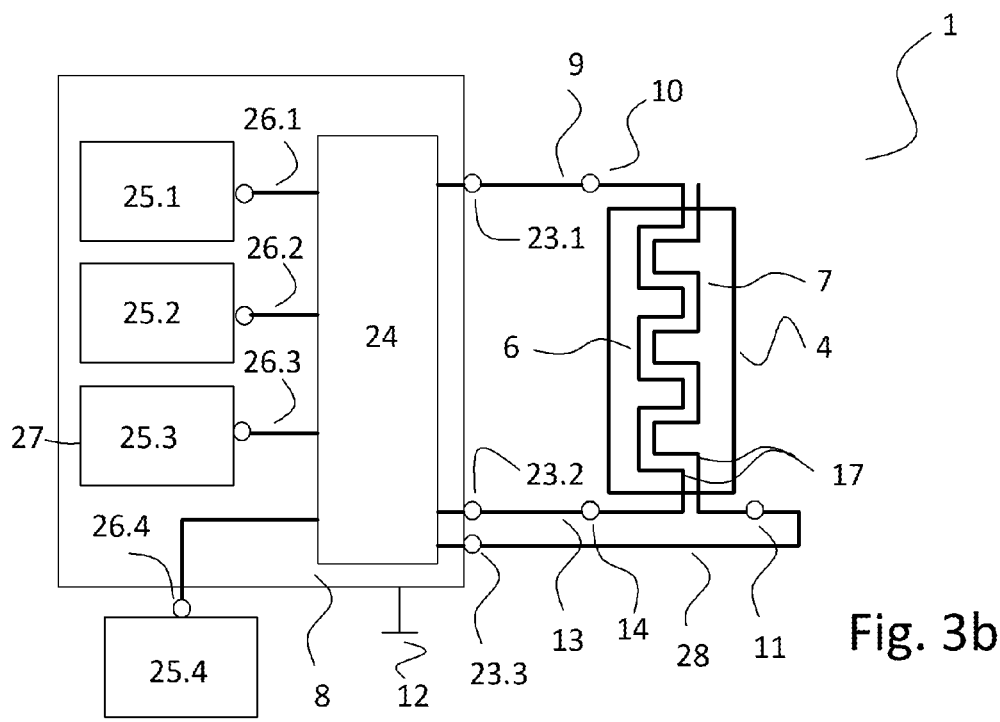
Figure 3C:
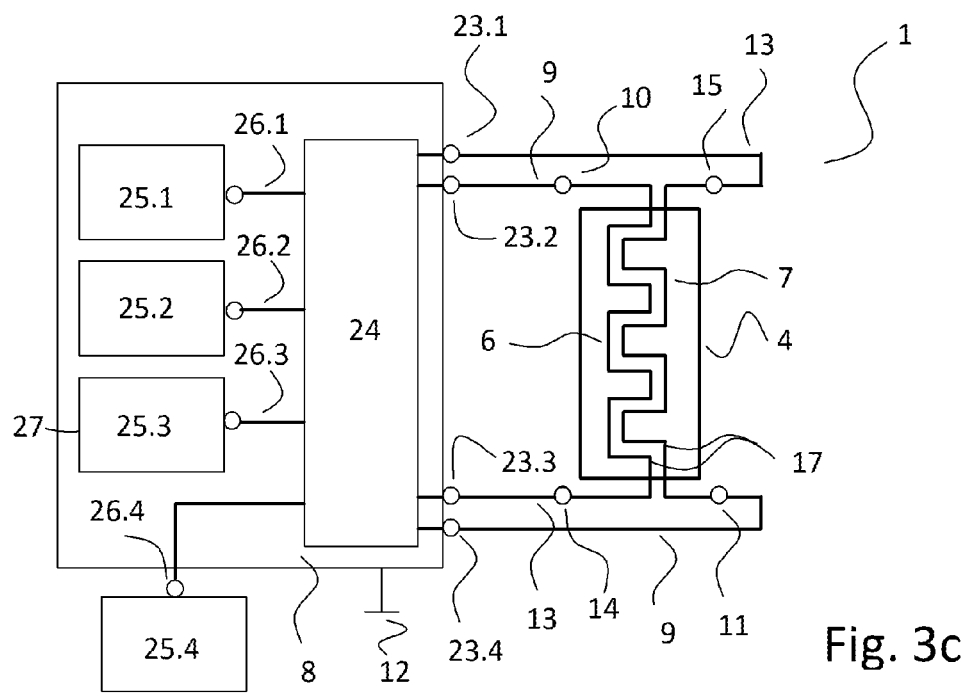
Figure 4:
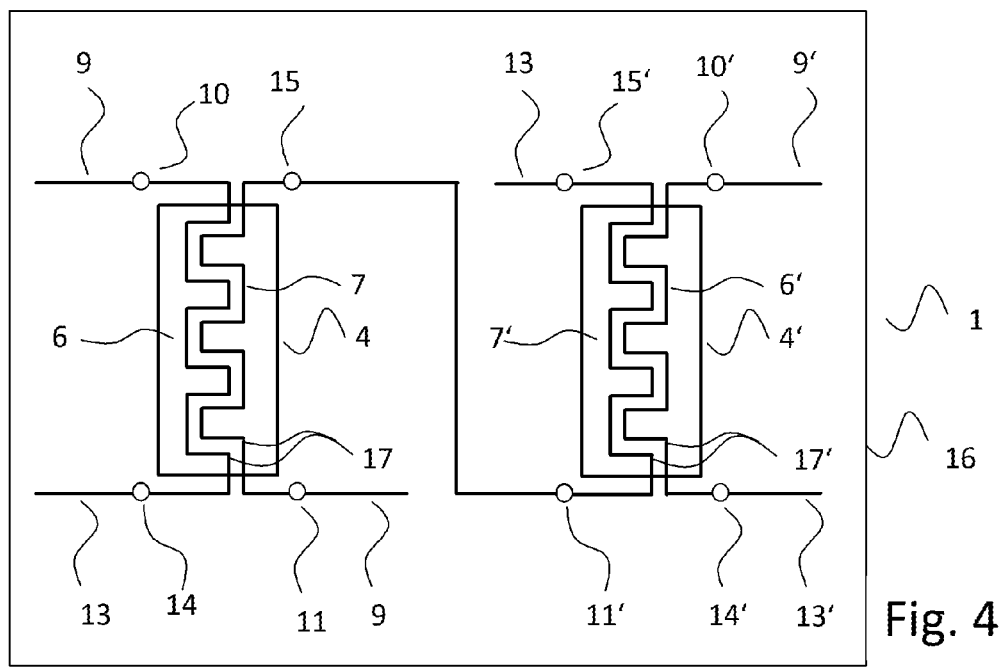
Figure 5:
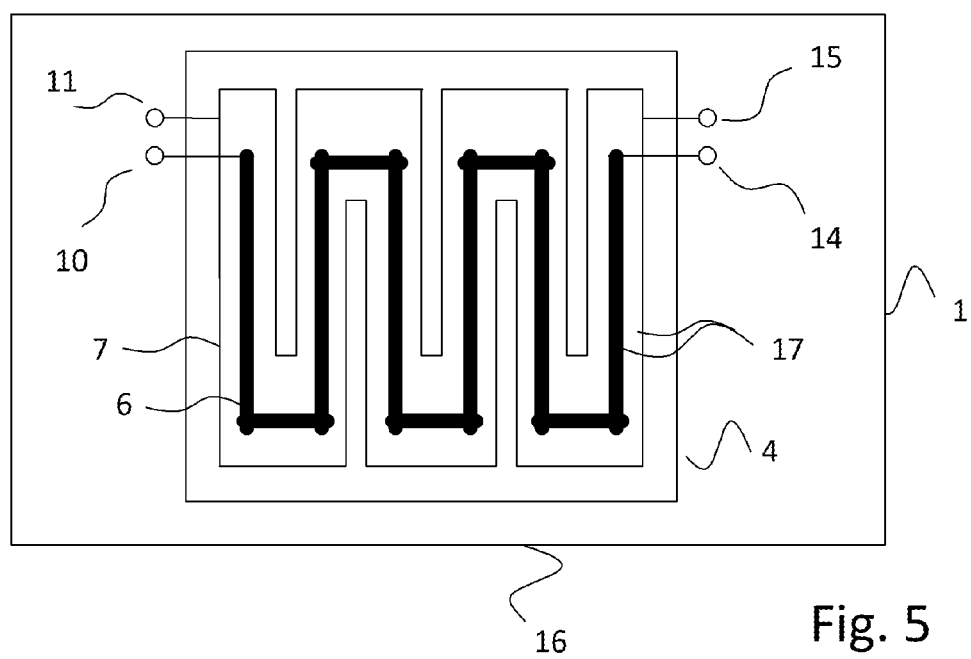

In the drawings:

FIG. 1 shows a schematic illustration of an instrument panel of a vehicle with a steering wheel having operating devices for safety-relevant functions, FIG. 2 shows a schematic illustration of the operating devices having detection areas and input means, FIG. 3a shows a schematic illustration of a sensor device according to the invention having an evaluation unit and a first sensor electrode connected via two connections, FIG. 3b shows a schematic illustration of a sensor device according to the invention having an evaluation unit and a first sensor electrode connected via two connections and a sensor electrode connected via one connection, FIG. 3c shows a schematic illustration of a sensor device according to the invention having an evaluation unit and two sensor electrodes each connected via two connections, FIG. 4 schematically shows a possible exemplary embodiment of two sensor electrodes of the sensor device according to the invention connected in series, FIG. 5 schematically shows a further exemplary embodiment of a sensor electrode on a printed circuit board, to be precise arranged on different layers of the printed circuit board, FIG. 6 shows a table of the possible connection configurations for carrying out the different measurements.

FIG. 1 shows an instrument panel 19 of a motor vehicle having a steering wheel 22. In this exemplary embodiment, the sensor device 1 according to the invention in the form of the operating device 2 is used as a steering wheel switch or steering wheel operating device. This means that the sensor electrodes 6, 7 and evaluation unit 8 (not illustrated in FIG.

1) of the sensor device 1 are integrated in the steering wheel 22, for example in the region of the operating device 2.

This arrangement allows the driver to make operating inputs on the steering wheel via the operating device 2 on the steering wheel 22, for example during the journey. In this case, the operating device 2 is arranged in the region of the steering wheel spokes 21, with the result that the fingers or the thumb of the driver's hand can be used as input means 3. The operating inputs may comprise the control of driving assistance systems, for example (partially) autonomous driving, of multimedia applications, of communication applications or else for any other applications in the vehicle. In this respect, there is no restriction to the function used.

Corresponding inputs and their actions can be represented on the dashboard 20 of the vehicle. Displays are usually used for this purpose, but they may also be installed at another location in the vehicle.

In another exemplary embodiment according to FIG. 1, the sensor device 1 according to the invention is in the form of the operating device 28 which is positioned directly on the steering wheel 22, to be precise in a region of the steering wheel rim on which the driver's hands are situated for steering the vehicle. The position of the operating device 28 comprises, for example, the 11 o'clock and 2 o'clock positions on the steering wheel and the adjoining regions. This hand position of the driver is ideal for a journey along a road with elongated bends, for example along the motorway or on country roads. Alternatively, however, the operating device 28 may also extend over the entire circumference of the steering wheel 22, with the result that a hand of the driver can be detected at any position of the steering wheel rim.

This arrangement makes it possible to detect the presence of an input means 3, the driver's hands in this exemplary embodiment, on the steering wheel 22. It is therefore possible to detect, for example in safety-relevant applications, for example (partially) autonomous driving, whether or not the driver has his hands on the steering wheel. In accordance with the detected state, the respective application can then be switched on or off and corresponding messages can be output on the dashboard 20.

FIG. 2 shows an exemplary embodiment of the operating device 2 from FIG. 1. The operating device 2 comprises a plurality of detection areas 4 on the sensor surface 5. Input means 3, such as the finger of the driver or of another person inside the vehicle here, can be selectively detected in the region of the detection areas 4 in order to detect corresponding operating inputs. In order to illustrate the respective functions, the detection areas are provided with corresponding symbols and, for reasons of clarity, can be combined to form groups 18 of detection areas 4.

The functions comprise, for example, driving assistance systems such as cruise control, active distance control, autonomous driving and communication and multimedia systems. In this respect, there is no restriction to particular functions which can be controlled using the operating device 2.

The operating device 2 according to FIG. 2 can also be integrated in a display of the vehicle (not separately illustrated) in an alternative exemplary embodiment in order to provide a touch-sensitive display. According to this application, the sensor electrodes 6, 7 and the evaluation unit 8 of the sensor device 1 are then integrated in the display.

FIG. 3a shows an exemplary embodiment of the sensor device 1 according to the invention. The sensor device 1 includes at least one detection area 4 which has a first sensor electrode 6. In this example, the first sensor electrode 6 is in the form of a meandering conductor track 17. The associated printed circuit board is not illustrated. As a result of the meandering structure, the available space in the region of the detection area 4 is used in an optimum manner and the detection probability is thus increased.

The sensor electrode 6 has a first connection 10 and a second connection 14, wherein these connections are arranged in mutually opposite end regions of the sensor electrode 6. In particular, the position of the connection 10 with respect to the connection 14 is selected in such a manner that a fault in the sensor electrode 6 can be detected as reliably as possible. This can be achieved, for example, by maximizing the distance or the signal path from the first connection 10 to the second connection 14 of the sensor electrode 6.

The first connection 10 of the first sensor electrode 6 is electrically connected to the connection 23.1 of the evaluation unit 8 via the connection line 9. The second connection 14 of the first sensor electrode 6 is electrically connected to the connection 23.2 of the evaluation unit 8 via a second connection line 13.

In order to carry out the different measurements of the sensor device 1 according to the invention, the evaluation unit 8 has a multiplicity of internal or external functional assemblies 25.1-25.4 and a switching matrix 24 which connects the connections 10 or 14 of the sensor electrode 6 to the connections 26.1-26.4 of the internal or external functional assemblies 24. In this case, the connections 26.1-26.4 of the internal or external functional assemblies 25.1-25.4 may be signal outputs or measuring inputs.

In a simple application, a first voltage level is provided at the connection 26.1, for example, by the internal functional assembly 25.1 and is supplied, via the switching matrix 24, to the connection 23.1 of the evaluation unit 8, with the result that this first voltage level is applied to the first connection 10 of the first sensor electrode 6. In order to check the continuity of the first sensor electrode 6, the second voltage level applied to the second connection 14 is supplied from the connection 23.2 of the evaluation unit 8, via the switching matrix 24, to the connection 26.3 of the internal or external functional assembly 25.3, for example. The internal or external functional unit 25.3 measures the second voltage level. By comparing the first and second voltage levels, for example by means of the evaluation unit 8, it is possible to check whether the first sensor electrode 6 is functional, in particular whether there has been no fracture in the conductor track. In the functional state, the first voltage level would have to correspond to the second voltage level.

In a similar manner to the continuity check, the internal functional assembly 25.1 can also determine, in addition to the voltage level which is supplied to the respective connection 10 or 14 of the sensor electrode 6 via the switching matrix 24, the current flowing in this case through the sensor electrode 6 in order to thus determine the resistance of the sensor electrode.

In order to detect the presence of an input means 3 (not illustrated in FIG. 3a) by means of the sensor device 1, the capacitance of the first sensor electrode 6 with respect to earth 12 can be determined. In this case, this capacitance is determined continuously in order to be able to detect changes in the capacitance as a result of the presence of an input means.

In this case, the capacitance can be measured out by evaluating charging and discharging curves of the respective capacitance, evaluating a frequency change according to the resonant circuit principle or else using the CVD method referred to in the exemplary embodiment according to FIG. 3c.

In order to ensure the corresponding functionalities and methods, the switching matrix or else the entire evaluation unit can have a cascaded design in order to ensure a plurality of parallel n:m connections. This enables parallel measurements, for example.

The above-mentioned exemplary embodiment relates to a configuration which provides the maximum possible selection in terms of measuring methods and connection configurations. However, there is no restriction of the sensor device 1 according to the invention to this. It is likewise also possible for only a limited selection of measuring methods and connection configurations to be selected or provided for operation. The sensor device 1 according to the invention is then implemented, for example, by hard-wiring one or more connections 26.1-26.4 of the respective internal or external functional assemblies 25.1-25.4 to the respective connections 23.1-23.2 of the evaluation unit 8 or directly to the respective connections 10 or 14 of the sensor electrode 6, with the result that the switching matrix 24, for example, requires only a limited selection of individual switches or is entirely dispensed with.

FIG. 3b shows how the sensor device 1 according to the exemplary embodiment described above can be extended with a further measuring possibility for increasing the measurement accuracy. For this purpose, a further, second electrode 7 was added to the arrangement according to FIG. 3a in the region of the detection area 4. In the example according to FIG. 3b, the first sensor electrode 6 and the second sensor electrode 7 are in the form of meandering conductor tracks 17 which intermesh. The associated printed circuit board is not illustrated. The conductor tracks 17 are directly adjacent, with the result that the presence of an input means 3 (not illustrated) in the region of the detection surface 4 acts on both sensor electrodes 6, 7.

The second sensor electrode 7 has a first connection 11 which is connected to the connection 23.3 of the evaluation unit 8 via the connection line 28.

In order to detect the presence of an input means, in addition to the capacitance of the first sensor electrode 6 with respect to earth 12, the capacitance between the first sensor electrode 6 and the second sensor electrode 7 can also be continuously measured here and the presence of an input means can be inferred if the capacitance changes. For this purpose, the functional assembly 25.3, for example, generates a stimulation signal at its output 26.3, which stimulation signal is supplied from the switching matrix 24 to the output 23.3 of the evaluation unit 8 and is therefore provided at the first connection 11 of the second sensor electrode 7.

This stimulation signal is coupled over to the first sensor electrode 6 via the capacitance between the first sensor electrode 6 and the second sensor electrode 7 and can be evaluated by the evaluation unit 8 via one of the functional assemblies 25.1, 25.2 or 25.4. The evaluation of charging and discharging curves of the respective capacitance, the evaluation of a frequency change according to the resonant circuit principle or else the CVD method cited in the exemplary embodiment according to FIG. 3c are again also suitable here as measuring methods for the continuous capacitance measurement.

FIG. 3c shows another exemplary embodiment of the sensor device 1 according to the invention. The sensor device 1 includes at least one detection area 4 having a first sensor electrode 6 and a second sensor electrode 7. In this example, the first sensor electrode 6 and the second sensor electrode 7 are in the form of meandering conductor tracks 17 which intermesh. The associated printed circuit board is not illustrated. The conductor tracks 17 are directly adjacent, with the result that the presence of an input means 3 (not illustrated) in the region of the detection surface 4 acts on both sensor electrodes 6, 7.

The sensor electrodes 6 and 7 have first connections 10, 11 and second connections 14, 15, wherein these connections are each arranged in mutually opposite end regions of the associated sensor electrode 6 or 7. In particular, the position of the connections 10 and 11 with respect to the connections 14 and 15 is selected in such a manner that a fault in the respective sensor electrode 6 or 7 can be detected as reliably as possible. This can be achieved, for example, by maximizing the distance or the signal path from the first connection 10, 11 to the second connection 14, 15 of the respective sensor electrode 6 or 7.

The first connections 10 and 11 of the first sensor electrode 6 and of the second sensor electrode 7 are electrically connected to the connections 23.2 and 23.4 of the evaluation unit 8 via two connection lines (9, 13). The second connections 14 and 15 of the first sensor electrode 6 and of the second sensor electrode 7 are electrically connected to the connections 23.3 and 23.1 of the evaluation unit 8 via two further connection lines (28, 29).

In order to carry out the different measurements of the sensor device 1 according to the invention, the evaluation unit 8 has a multiplicity of internal or external functional assemblies 25.1-25.4 and a switching matrix 24 which connects the connections 10, 11, 14 or 15 of the sensor electrodes 6 and 7 to connections 26.1-26.4 of the internal or external functional assemblies 24. In this case, the connections 26.1-26.4 of the internal or external functional assemblies 25.1-25.4 may be signal outputs or measuring inputs.

In a simple application, a first voltage level is provided at the connection 26.1, for example, by the internal functional assembly 25.1 and is supplied, via the switching matrix 24, to the connection 23.2 of the evaluation unit 8, with the result that this first voltage level is applied to the first connection 10 of the first sensor electrode 6. In order to check the continuity of the first sensor electrode 6, the second voltage level applied to the second input 14 is supplied from the connection 23.3 of the evaluation unit 8, via the switching matrix 24, to the connection 26.3 of the internal or external functional assembly 25.3, for example. The internal or external functional unit 25.3 measures the second voltage level. By comparing the first and second voltage levels, for example by means of the evaluation unit 8, it is possible to check whether the first sensor electrode 6 is functional, in particular whether there has been no fracture in the conductor track. In the functional state, the first voltage level would have to correspond to the second voltage level. This continuity check can also be accordingly carried out on the second sensor electrode 7 or with an inverted connection configuration.

In a similar manner to the continuity check, the internal functional assembly 25.1 can also determine, in addition to the voltage level which is supplied to the respective connection 10, 11, 14 or 15 of the respective sensor electrode 6 or 7 via the switching matrix 24, the current flowing in this case through the respective sensor electrode 6 or 7 in order to thus determine the resistance of the respective sensor electrode.

In order to detect the presence of an input means 3 (not illustrated in FIG. 3c) by means of the sensor device 1, the CVD method can be used. This method can be used to determine the capacitance of the first sensor electrode 6 with respect to earth 12 and the capacitance between the first sensor electrode 6 and the second sensor electrode 7. In this case, these capacitances are determined continuously in order to be able to detect changes in the capacitance as a result of the presence of an input means. For further information on this method, reference is made here to the non-pre-published document DE 102015112444.0 by the applicant.

In order to determine the capacitance according to the CVD method, the internal or external functional assembly 25.2, for example, can provide a stimulation signal for the first sensor electrode 6 at the connection 26.2. The switching matrix 24 supplies this signal to the first connection 10 of the first sensor electrode 6 via the connection 23.2 of the evaluation unit 8. In order to measure the capacitance change according to the CVD method, the internal or external functional assembly 25.3 has a sample-and-hold element. The switching matrix 24 connects the connection 26.3 of the internal or external functional assembly 25.3 to the connection 23.4 of the evaluation unit 8, with the result that the sample-and-hold element can receive measured values from the first connection 11 of the second sensor electrode. In this configuration, the capacitance between the first sensor electrode 6 and the second sensor electrode 7 can thus be measured.

In order to ensure the corresponding functionalities and methods, the switching matrix can also have a cascaded design in order to ensure a plurality of parallel n:m connections. This enables parallel measurements, for example.

The above-mentioned exemplary embodiment relates to a configuration which provides the maximum possible selection in terms of measuring methods and connection configurations. However, there is no restriction of the sensor device 1 according to the invention to this. It is likewise also possible for only a limited selection of measuring methods and connection configurations to be selected or provided for operation. The sensor device 1 according to the invention is then implemented, for example, by hard-wiring one or more connections 26.1-26.4 of the respective internal or external functional assemblies 25.1-25.4 to the respective connections 23.1-23.4 of the evaluation unit 8 or directly to the respective connections 10, 11, 14 or 15 of the corresponding sensor electrodes 6 and 7, with the result that the switching matrix 24, for example, requires only a limited selection of individual switches or is entirely dispensed with.

FIG. 4 shows another exemplary embodiment of the sensor device 1 according to the invention without the illustration of the evaluation unit 8. In this case, two detection areas 4 and 4' with the respective two sensor electrodes 6, 6' and 7, 7' on a printed circuit board 16 are illustrated.

The special feature of this exemplary embodiment is that the second sensor electrodes 7 and 7' in the adjacent detection areas 4 and 4' are connected here in series via the respective first connection 11' and second connection 15. The remaining connections 10, 10', 11, 14, 14' and 15' are connected to the evaluation unit 8 via the corresponding connection lines 9, 9', 13, 13', 28 and 29. With this configuration, the evaluation unit 8 can apply the stimulation signal, for example, to the first connection 11 of the second sensor electrode 7 in the first detection area 4 according to the CVD method. This stimulation signal is then also supplied to the first connection 11' of the second sensor electrode 7' in the second detection area 4' via the second connection 15 of the second sensor electrode 7 in the first detection area 4. A stimulation signal generated by the evaluation unit 8 can thereby be used for a plurality of detection areas in order to determine the capacitance in each case between the first sensor electrode 6, 6' and the second sensor electrode 7, 7' in the respective first detection area 4 or second detection area 4'.

Nevertheless, the evaluation unit 8 can check the sensor electrodes 6, 6', 7 or 7' in this exemplary embodiment. For example, the evaluation unit 8 can be used to carry out a continuity check or a resistance measurement between the first connection 10 and second connection 14 of the first sensor electrode 6 in the first detection area 4 in order to be able to check the functionality of the sensor electrode 6. This method can accordingly be used for the first sensor electrode 6' in the second detection area 4'.

Furthermore, this continuity check or resistance measurement of the second sensor electrodes 7 and 7' connected in series in the first detection area 4 and in the second detection area 4' can likewise be carried out by the evaluation unit 8 via the connections 11 and 15'.

Alternatively, however, the first sensor electrodes 6 and 6' or the first and second sensor electrodes 6, 6', 7 and 7' in the adjacent detection areas 4 and 4' could also be connected in series. The described measuring methods can accordingly be used here.

The sensor device 1 according to the invention is also not restricted to two detection areas according to this exemplary embodiment. A corresponding connection of first or second sensor electrodes from more than two detection areas would also be conceivable.

As a result of this measure, it would be possible, for example, to fundamentally combine the respective sensor electrodes which are used as stimulation electrodes, for example in the CVD method, in order to save connection lines.

FIG. 5 shows another exemplary embodiment of the sensor device 1 according to the invention without an illustration of the evaluation unit 8 and the connection lines 9, 13, 28 and 29. In this exemplary embodiment, the sensor electrodes 6 and 7 in the detection area 4 are arranged on two different sides on a printed circuit board 16. In this case, the first sensor electrode 6 is situated on the top side and the second sensor electrode 7 is situated on the underside of the printed circuit board 16. In order to ensure optimum coupling between the first sensor electrode 6 and the second sensor electrode 7 in this case, the width of the conductor track 17' of the second sensor electrode 7 was increased.

Use of the described exemplary embodiment in a multi-layer printed circuit board would also be conceivable here.

FIG. 6 shows a table containing various measuring possibilities of the sensor apparatus 1 described according to FIG. 3c and of the corresponding measuring methods in the case of different configurations of the respective connections 10, 11, 14 and 15, wherein this list should not be understood as conclusive and restrictive. The first row of the table initially cites the reference signs from FIG. 3c of the individual connections, then of the interconnected connections, the system earth and finally a description of the measurement. The different measuring possibilities are shown underneath by virtue of crosses indicating the relevant measuring points. If the system earth 12 is not selected, this is therefore a measurement which is carried out between the respective selected connections or the interconnected connections.

The measurements listed here can also be carried out in a parallel manner by the sensor apparatus 1, wherein this may be, on the one hand, a simultaneous measurement by at least two of the four functional assemblies 25.1-25.4 from FIG. 3c. On the other hand, however, sequential recording of measured values can also be carried out by one of the four functional assemblies 25.1-25.4 with the aid of the switching matrix 24. In this case, however, the sampling by the selected functional assembly 25.1-25.4 must be carried out in a considerably faster manner than the change in the measured values.

The invention claimed is:

1. A sensor device for an operating device for controlling safety-relevant functions for a vehicle,
   the sensor device being for capacitively detecting a presence of an input means in the region of a detection area of a sensor surface, and comprising:
   a first electrically conductive sensor electrode, which is arranged in the region of the detection area; and
   an evaluation unit which is electrically connected to an associated connection of the first sensor electrode via a first connection line and is designed to measure the capacitance with respect to earth at the connection of the first sensor electrode,
   wherein the evaluation device is electrically connected to a second associated connection of the first sensor electrode via a second connection line, wherein the first connection and the second connection are arranged in mutually opposite end regions of the first sensor electrode, and
   wherein the evaluation unit is configured to carry out a continuity check comprising:
      applying a first voltage level to the first connection of the first sensor electrode;
      measuring a second voltage level at the second connection of the first sensor electrode; and
      determining a fault, separate from the input means, in the first sensor electrode by detecting a deviation between the first voltage level and the second voltage level.

2. The sensor device for a vehicle according to claim 1, wherein a second electrically conductive sensor electrode having a first associated connection, which is connected to the evaluation unit via a third connection line, is arranged in the region of the detection area.

3. The sensor device for a vehicle according to claim 2, wherein the second electrically conductive sensor electrode has a second associated connection which is connected to the evaluation unit via a fourth connection line, wherein the first connection and the second connection are arranged in mutually opposite end regions of the second sensor electrode.

4. The sensor device for a vehicle according to claim 1, wherein the evaluation unit is configured to measure a voltage drop between the first connection and the second connection of the sensor electrode.

5. The sensor device for a vehicle according to claim 1, wherein the evaluation unit is configured to carry out a resistance measurement on the sensor device between the first connection and the second connection of the sensor electrode.

6. The sensor device for a vehicle according to claim 1, wherein the fault comprises a sensor electrode fracture or a conductor track fracture, and wherein the evaluation unit is further configured to carry out a predetermined fault response measure in response to determining the fault.

7. The sensor device for a vehicle according to claim 1, wherein the evaluation unit is configured to measure the capacitance with respect to earth at the first connection and at the second connection of the first sensor electrode and/or of the second sensor electrode.

8. The sensor device for a vehicle according to claim 1, wherein the evaluation unit is configured to respectively interconnect the first connections and second connections of the first sensor electrode and/or of the second sensor electrode and to measure the capacitance of the first sensor electrode and/or of the second sensor electrode with respect to earth via the respective connections.

9. The sensor device for a vehicle according to claim 1, wherein the evaluation unit is configured to respectively interconnect the first connections and second connections of the first sensor electrode and of the second sensor electrode and to measure the capacitance between the first sensor electrode and the second sensor electrode via the respective connections.

10. The sensor device for a vehicle according to claim 2, wherein the evaluation unit is configured to carry out a capacitance measurement between a first connection or a second connection of the first sensor electrode and a first connection or a second connection of the second sensor electrode.

11. The sensor device for a vehicle according to claim 2, wherein the evaluation unit is configured to interconnect the first connection and the second connection of a first sensor electrode or of a second sensor electrode and to carry out a capacitance measurement between the interconnected connections of the first sensor electrode or of the second sensor electrode and the first connection or second connection of the respective other sensor electrode.

12. The sensor device for a vehicle according to claim 7, wherein the evaluation unit is configured to carry out a first capacitance measurement with a first connection configuration and to then carry out at least one second capacitance measurement according to one of the above-mentioned methods with a second connection configuration, wherein the evaluation unit is also designed to compare the measured values from the first and at least second capacitance measurements with one another and/or with a desired value.

13. The sensor device for a vehicle according to claim 7, wherein the evaluation unit is configured to use the signals or voltage levels applied to the first connections and/or second connections of the first sensor electrode and/or of the second sensor electrode for the capacitance measurement to check the continuity and/or to measure the resistance of the first sensor electrode and/or of the second sensor electrode.

14. The sensor device for a vehicle according to claim 6, wherein the evaluation unit is configured to carry out the capacitance measurement and/or continuity check and/or resistance measurement in a parallel manner.

15. The sensor device for a vehicle according to claim 1, wherein the first sensor electrode and/or the second sensor electrode is/are in the form of a metal structure on a printed circuit board.

16. The sensor device for a vehicle according to claim 2, wherein the first sensor electrode and the second sensor electrode are in the form of planar meandering conductor tracks and the first sensor electrode and the second sensor electrode are arranged in an intermeshing manner.

17. A method for capacitively detecting a presence of an input means in the region of a detection area of a sensor surface with a first electrically conductive sensor electrode, the method comprising:
   measuring, by an evaluation unit, the capacitance of the first sensor electrode with respect to earth at a first connection via a first connection line;
   carrying out, by the evaluation unit, least one measurement for increasing the measurement accuracy and/or the detection of faults via a second connection line with an associated second connection of the first sensor electrode; and performing, by the evaluation unit, a continuity check comprising:
applying a first voltage level to the first connection of the first sensor electrode;
measuring a second voltage level at the second connection of the first sensor electrode; and
determining a fault, separate from the input means, in the sensor surface by detecting a deviation between the first voltage level and the second voltage level.

18. The method according to claim 17, wherein the evaluation unit carries out measurements on a second electrically conductive sensor electrode in the region of a detection area at a first and/or second associated connection via a third or a fourth connection line.

19. The method according to claim 17, wherein the evaluation unit measures a voltage drop at both connections of the respective sensor electrode.

20. The method f according to claim 17, further comprising: carrying out, by the evaluation unit, a resistance measurement between the first connection and second connection of the respective sensor electrode.

21. The method according to claim 17, wherein the evaluation unit respectively measures the capacitance with respect to earth at the first connection and at the second connection of a sensor electrode.

22. The method according to claim 17, further comprising:
interconnecting the first connections and second connections of the respective first sensor electrode and/or second sensor electrode; and
measuring the capacitance of the first sensor electrode and/or of the second sensor electrode with respect to earth via the respective connections.

23. The method according to claim 18, further comprising:
interconnecting the first connections and second connections of the first sensor electrode and of the second sensor electrode; and measuring the capacitance between the first sensor electrode and the second sensor electrode via the respective connections.

24. The method according to claim 18, further comprising:
carrying out, by the evaluation unit, a capacitance measurement between the first sensor electrode and the second sensor electrode via a first connection or a second connection of the first sensor electrode and via a first connection or a second connection of the second sensor electrode.

25. The method according to claim 18, further comprising:
interconnecting the first connection and the second connection of a first sensor electrode or of a second sensor electrode; and
carrying out a capacitance measurement between the interconnected connections of the first sensor electrode or of the second sensor electrode and the first connection or second connection of the respective other sensor electrode.

26. The method according to claim 21, wherein the evaluation unit carries out a first capacitance measurement with a first connection configuration and then carries out at least one second capacitance measurement according to one of the above-mentioned methods with a second connection configuration, wherein the evaluation unit compares the measured values from the first and at least second capacitance measurements with one another and/or with a desired value.

27. The method for according to claim 21, further comprising: applying, by the evaluation unit, signals or voltage levels to the first connections and/or second connections of the first sensor electrode and/or of the second sensor electrode for the capacitance measurement and likewise uses these signals or voltage levels to check the continuity and/or to measure the resistance of the first sensor electrode and/or of the second sensor electrode.

28. The method according to claim 27, wherein the evaluation unit carries out the capacitance measurement and/or continuity check and/or resistance measurement in a parallel manner.

29. The method according to claim 21, wherein the evaluation unit carries out the capacitance measurement according to the capacitive voltage divider method.

* * * * *